US010216478B2

(12) United States Patent
Chu et al.

(10) Patent No.: US 10,216,478 B2
(45) Date of Patent: Feb. 26, 2019

(54) INCREASING RADIX SORTING EFFICIENCY UTILIZING A CROSSOVER POINT (71) Applicant: International Business Machines Corporation, Armonk, NY (US)

(72) Inventors: Lee C. Chu, Toronto (CA); Joshua R. Tiefenbach, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 15/084,626

(22) Filed: Mar. 30, 2016

(65) Prior Publication Data

US 2017/0286459 A1 Oct. 5, 2017

(51) Int. Cl.
*G06F 17/30* (2006.01)
*G06F 7/24* (2006.01)
*G06F 7/36* (2006.01)

(52) U.S. Cl.
CPC .................. *G06F 7/24* (2013.01); *G06F 7/36* (2013.01); *G06F 17/30306* (2013.01); *G06F 17/30312* (2013.01); *G06F 17/30595* (2013.01)

(58) Field of Classification Search
CPC ......... G06F 17/30306; G06F 17/30312; G06F 7/24; G06F 17/30595; G06F 7/36; Y10S 707/99937
See application file for complete search history.

(56) References Cited

U.S. PATENT DOCUMENTS

| | | | |
|---|---|---|---|
| 5,440,734 A | 8/1995 | Wagar | |
| 5,487,164 A * | 1/1996 | Kirchhofer | ............... G06F 7/24 |
| 5,678,043 A * | 10/1997 | Ng | ..................... G06F 17/30327 |
| | | | 341/106 |
| 5,924,091 A * | 7/1999 | Burkhard | .................. G06F 7/24 |
| 6,274,836 B1 | 8/2001 | Walach | |
| 7,293,022 B2 * | 11/2007 | Murray | ............. G06F 17/30985 |
| 7,467,138 B2 | 12/2008 | Carroll | |
| 7,624,107 B1 | 11/2009 | Grand | |
| 7,680,791 B2 | 3/2010 | Callaghan et al. | |
| 7,870,159 B2 | 1/2011 | Carroll | |
| 8,316,060 B1 | 11/2012 | Snyder, II et al. | |

(Continued)

OTHER PUBLICATIONS

Chu et al., "Increasing Radix Sorting Efficiency Utilizing a Crossover Point", U.S. Appl. No. 15/668,769, filed Aug. 4, 2017, 24 pages.

(Continued)

*Primary Examiner* — Merilyn P Nguyen
(74) *Attorney, Agent, or Firm* — Daniel R. Simek (57) ABSTRACT

Embodiments of the present invention provide a method, computer program product and system for increasing sorting efficiency by utilizing a determined crossover point. Initially, a set of data, containing a number of tuples, to be sorted is received. A determination is made as to the number of radix sort iterations to perform based on the number of tuples of the received data. A countdown timer is set based on the determined number of radix sort iterations. Radix sorts iterations are performed recursively. After each iteration, the countdown timer is decreased. Upon the countdown timer reaching zero, one or more comparison sorts is performed on the remainder of the set of data not sorted by the radix sorting.

20 Claims, 8 Drawing Sheets

(56) References Cited

U.S. PATENT DOCUMENTS

| | | | |
|---|---|---|---|
| 8,515,983 B1* | 8/2013 | Snyder, II | G06F 17/30985 |
| | | | 707/760 |
| 8,812,516 B2 | 8/2014 | Ingle et al. | |
| 9,852,141 B2 | 12/2017 | Boehme et al. | |
| 9,928,261 B2 | 3/2018 | Bordawekar et al. | |
| 2006/0161546 A1* | 7/2006 | Callaghan | G06F 17/30595 |
| 2007/0233439 A1* | 10/2007 | Carroll | G06F 17/5022 |
| | | | 703/6 |
| 2008/0215584 A1 | 9/2008 | Furusho | |
| 2010/0235365 A1 | 9/2010 | Newby, Jr. | |
| 2011/0055916 A1 | 3/2011 | Ahn | |
| 2012/0176402 A1 | 7/2012 | Kim et al. | |
| 2014/0188906 A1 | 7/2014 | Muller et al. | |
| 2014/0188909 A1 | 7/2014 | Asaad et al. | |
| 2014/0372456 A1 | 12/2014 | Merrill | |
| 2014/0379735 A1 | 12/2014 | Hsu et al. | |
| 2015/0046476 A1* | 2/2015 | Asaad | G06F 17/3053 |
| | | | 707/752 |
| 2015/0178594 A1* | 6/2015 | Curington | G06K 9/00201 |
| | | | 382/154 |
| 2015/0213076 A1 | 7/2015 | Bordawekar et al. | |
| 2015/0293957 A1* | 10/2015 | Bordawekar | G06F 12/0238 |
| | | | 707/753 |
| 2016/0124755 A1* | 5/2016 | Balakrishnan | G06F 7/36 |
| | | | 712/18 |
| 2017/0090817 A1* | 3/2017 | Cho | G06F 7/24 |

OTHER PUBLICATIONS

IBM Appendix P., "List of IBM Patents or Patents to be Treated as Related", Filed Herewith, 2 pages.

"Introsort"; Wikipedia, the free encyclopedia; last modified Dec. 2, 2015; 3 pages; <https://en.wikipedia.org/wiki/Introsort>.

Evidence of Grace Period Use or Sale: "What's New in dashDB"; Update May 14, 2015; 7 pages; <http://www-01.ibm.com/support/docview.wss?uid=swg21961758>.

* cited by examiner

INCREASING RADIX SORTING EFFICIENCY UTILIZING A CROSSOVER POINT

BACKGROUND OF THE INVENTION

The present invention relates generally to the field of information technology, and in particular to sorting data.

Information technology encompasses the organization and manipulation of an ever increasing volume of data. Generally, large quantities of data are relatively useless until the data is analyzed and presented in a meaningful fashion. Computers are often used to manage large volumes of data.

A sorting algorithm is an operation which arranges and optimizes data. Sorting represents the process of arranging and organizing items systematically. Generally, sorting algorithms place data elements in a specified order. Optimizing the speed in which data is sorted is a dominant principle to improving the efficiency and effectiveness of data management.

SUMMARY

According to one embodiment of the present invention, a method for increasing sorting efficiency utilizing a crossover point is provided, the method comprising: receiving, by one or more processors, a set of data to be sorted, wherein the set of data includes a number of tuples; determining, by one or more processors, a number of iterations of radix sorting to perform on keys of the set of data based, in part, on the number of tuples; recursively performing, by one or more processors, radix sorting according to the determined number of iterations; and subsequent to recursively performing radix sorting according to the determined number of iterations, performing, by one or more processors, one or more comparison sorts on a portion of the set of data subsequent to keys of the set of data sorted by the radix sorting.

Another embodiment of the present invention provides a computer program product for sorting efficiency utilizing a crossover point, based on the method described above.

Another embodiment of the present invention provides a computer system for sorting efficiency utilizing a crossover point, based on the method described above.

DETAILED DESCRIPTION

The embodiments of the present invention will be described in the context of electronic devices and data management. Massive volumes of data are generated, stored, and processed to meet the innumerable demands of society. Electronic devices, such as personal computers, servers, mainframes, tablets, mobile smart phones, e-readers, or any other electronic devices, are continually increasing their processing speed and storage capacity, in efforts to keep up with the demands of society.

Embodiments of the present invention provide methods, systems, and program products to manipulate the massive data expansion both in volume and use. An aspect of an embodiment of the present invention involves sorting algorithms. Sorting algorithms are used to sort data. Generally, a sorting algorithm places elements in a list in a specific order. Performance of a sorting algorithm may be determined by a time complexity notation which quantifies an amount of time an algorithm takes to run as a function of the length of the string representing the input. The time complexity of an algorithm may commonly be expressed using big O notation. Big O notation commonly characterizes functions according to their growth rates, where the big O notation usually provides an upper bound on the growth rate of the given unction.

Sorting algorithms are an important aspect of data management. Generally, most sorting algorithms work by comparing the data to be sorted. Each sorting algorithms has particular strengths and weaknesses.

For example, sorting algorithms are usually judged by efficiency, required processing and speed. Most of the algorithms in use have an algorithmic efficiency of either $O(n^2)$ or $O(n*\log(n))$, where n represents the number of records to be sorted. Those skilled in the art appreciate that sorting algorithms normally may not perform better than $O(n*\log(n))$.

There are many types of sorting algorithms. The present invention utilizes both a radix sorting algorithm and a comparison sorting algorithm. Generally, the performance of radix sort algorithm is described by the number of times that each item much be examined. In contrast, a comparison based sort is described by the number of comparisons that are required to order n items.

In a radix sort, each key is figuratively placed into a bucket, where a key is generally the next byte (or group of bytes) to be sorted. Once in a bucket, each key is compared to the other keys in each respective bucket. Each bucket preserves the original order of the keys, therefore maintaining a one-to-one correspondence between each bucket and its value. After each iterative sort, the process repeats by placing the next significant digit into a bucket, until there are no more digits to process.

Figure 1:
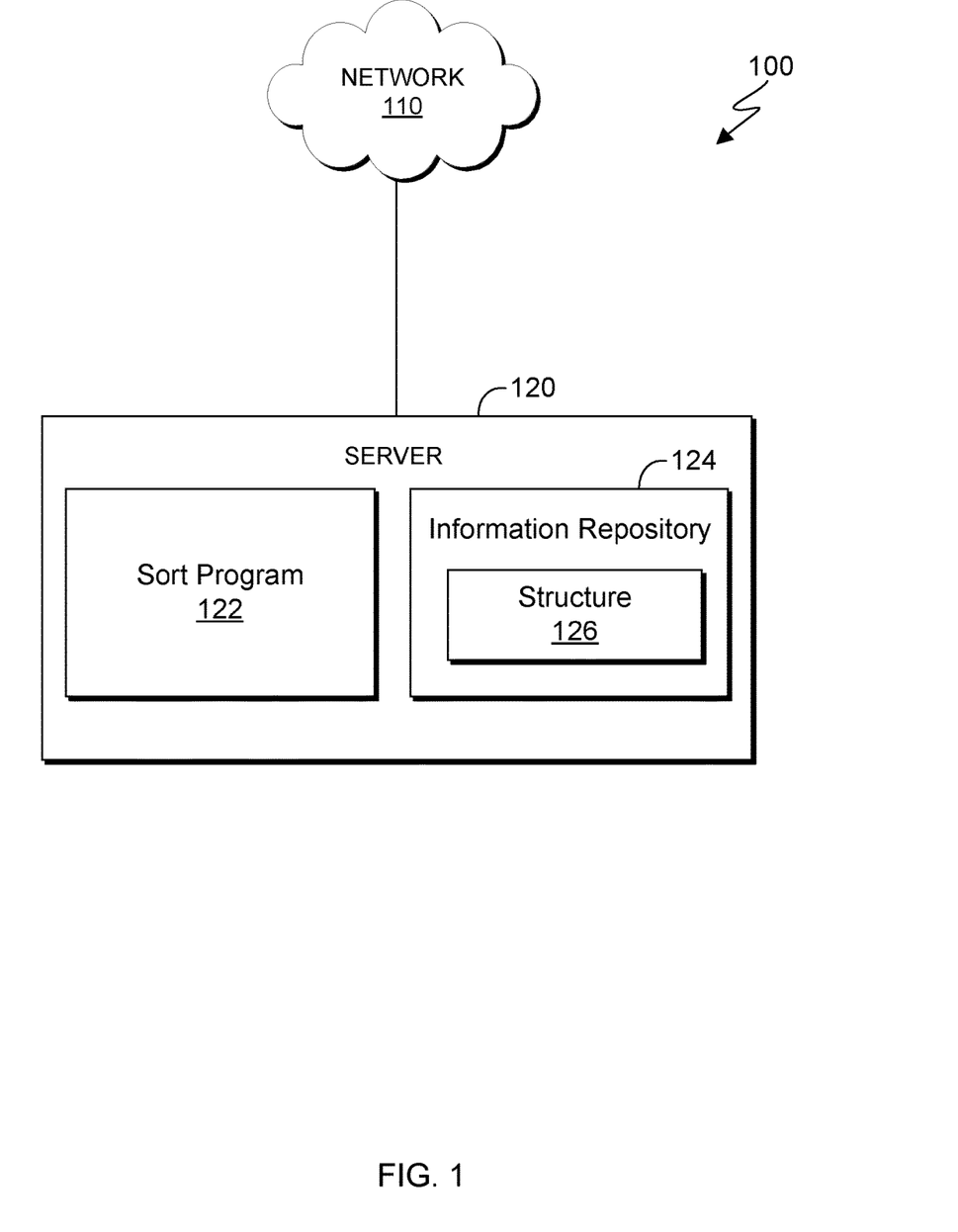
FIG. 1 is a functional block diagram illustrating a data processing environment, in accordance with an embodiment of the present invention.

The present invention will now be described in detail with reference to the Figures. FIG. 1 is a functional block diagram depicting a data processing environment, generally designated 100, in accordance with an embodiment of the present invention. FIG. 1 provides only an illustration of one implementation, and does not imply any limitations with regard to the environments in which different embodiments may be implemented. Modifications to environment 100 may be made by those skilled in the art without departing from the scope of the invention as recited by the claims. While FIG. 1 shows server 120 having various components, it is understood that implementing all of the illustrated components is not a requirement. Greater or fewer components may alternatively be implemented. For example, server 120 may include internal and external hardware components, as depicted and described in further detail with respect to FIG. 4. Data processing environment 100 includes server 120, connected over network 110.

Network 110 may be a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between server 120 additional computing devices and/or servers, not shown, in accordance with embodiments of the invention. Network 110 may include wired, wireless or fiber optic connections.

In the embodiment, server 120 is a server computer. In other embodiments, server 120 may be a management server, a web server or any other electronic device capable of receiving and sending data. In another embodiment, server 120 may represent a server computing system utilizing multiple computers as a server system, such as in a cloud computing environment. In other embodiment, server 120 may be a computing device such as a laptop computer, a tablet computer, a netbook computer, a personal computer (PC), a desktop computer, a personal digital assistant (PDA), a smart phone, or any programmable electronic device. Server 120 and/or computing device may be capable of communicating via network 110. Server 120 contains sort program 122 and information repository 124.

In an embodiment, server 120 may include a user interface (not shown). The user interface may be, for example, a graphical user interface (GUI) or a web user interface (WUI). The user interface may display text, documents, web browser windows, user options, application interfaces, instructions for operation, and the like. A user interface, refers to the information (such as graphic, text, and sound) a program presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation.

Information repository 124 may include any suitable volatile or non-volatile computer readable storage media, and may include random access memory (RAM) and cache memory (not depicted in FIG. 1). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. Information repository 124 can be implemented using any architecture known in the art such as, for example, a relational database, an object-oriented database, and/or one or more tables. Information repository 124 may contain lookup tables, databases, charts, graphs, functions, equations, and the like that display scroll program may access. While depicted on server 130, in the exemplary embodiment, information repository 124 may be on a remote server or a "cloud" of computers interconnected by one or more networks utilizing clustered computers and components to act as a single pool of seamless resources, accessible to sort program 122 via network 110.

Structure 126 represents one or more structures. For example, structure 126 may contain two structures: structure one is the original set of data to be sorted and structure two is the key+payload array (used for radix sorting). The structure comprising the original set of data may be referred to as a sort data store (SDS) bucket. The key+payload structure represents a positional notation of the original keys. The key+payload structure may be created upon the implementation of a radix sort, alternatively, the key+payload structure may exist prior to the commencement of a radix sort. The key+payload structure may contain two arrays which link the key being sorted to its original location in the original set of data. For example, the 'key' structure may contain bytes being sorted, while the 'payload' structure represents the location of the byte(s) of the original keys. For instance, under a radix sort, data from the SDS bucket may be copied and placed into a radix key in small pieces and subsequently stored in the key+payload array. Further, the payload contains information to access a row in the SDS bucket corresponding to an entry in the key+payload array.

Sort program 122 may be initiated by any known means in the art. Sort program 122 may be performed on any data structure which can be supported by a radix sort. In an embodiment, sort program 122 utilizes the performance of a radix sort, while avoiding a common performance pitfalls, such as a common key prefix, especially with longer keys. Radix sort $O(k*n)$ is a complexity equation for n keys where k is the number of bytes the radix sort needs to look at to determine the final sorting order. In certain circumstances a, radix sorts $O(k*n)$, is faster than a comparison sort $O(n \log n)$. Alternatively, in other circumstances a comparison sort $O(n \log n)$ is faster than a radix sorts $O(k*n)$.

Embodiments of the present invention determine an idealized crossover point to switch from a radix sort to a comparison sort, in order to improve the speed and efficiency of sorting data. Generally, a radix sort of $O(k*n)$, is the lower end of the radix sorts performance capabilities. For example, the large the value of k becomes, then the less affective a radix sort is. Therefore, sort program 122 calculates a crossover point between the radix sort, $O(k*n)$, and the comparison sort, $O(n \log n)$. At the determined crossover point, sort program 122 is able to direct the comparison sort to continue sorting at approximately where the radix sort left off. Thus, the comparison sort does not start from the very first byte of the sorting key. Sort program 122 may determine the cross over point when radix sort of $O(k*n)$, equals the comparison sort, $O(n \log n)$. Therefore, sort program 122 may determine the crossover point occur after $\log(n)$ iterations of a radix sort, where n is the total number of tuples to be sorted in the original set of data. Stated a different way, calculating the crossover point is between $O(k*n)$, of the radix sort, and $O(n \log n)$, of a comparison sort, is based on determining where both approaches are equally beneficial. For example, $k*n=n \log n$. Therefore the initial countdown timer is based on log 2 (the number of values to sort).

Upon activating sort program 122, server 120, initially determines a crossover point. The crossover point, as determined by sort program 122, is reached when the radix switches to a comparison sort. In an embodiment, a countdown timer counts each iteration of the radix sort to control when to switch to the comparison sort. For example, the countdown timer, once set, decreases for every byte that the radix sort processes. Thereby once the countdown timer reaches zero, sort program 122 switches the sorting to a comparison sort.

For example, during sorting, rows in the original key (structure one) will never move, rather the rows in the key+payload (structure two) will move. Those skilled in the art will appreciate that it utilizes less processing power to move the key+payload rows around as said rows occupy less memory than a row in the original key structure (structure one). A portion may be stored at a time and if more key is required, the payload points to the original key, thereby allowing the system to grab the next portion. As the rows in key+payload structure (structure two) are moved during sorting, the payload is the only place which directs where the corresponding original key resides. In an alternative embodiment, they rows in the original key (structure one) will move.

In an embodiment, the comparison sort is performed on the original data and not the transformed radix sort data.

Figure 2:
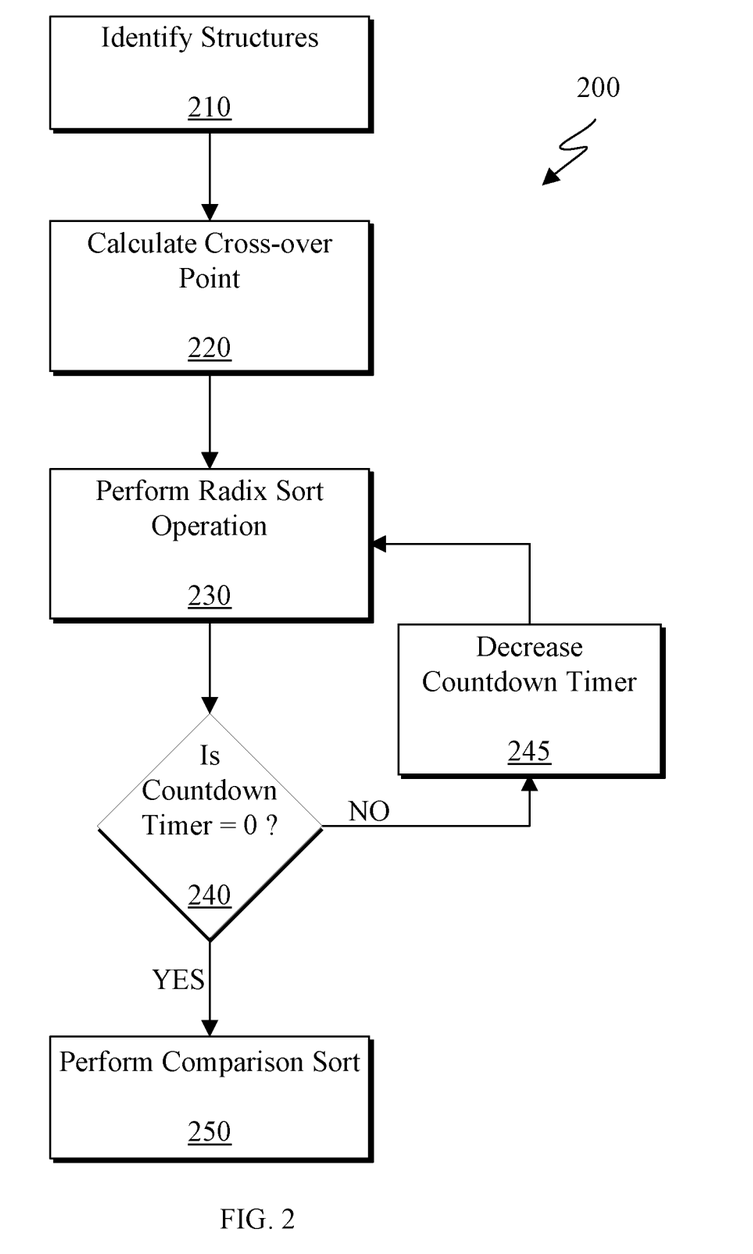
FIG. 2 is a flow chart illustrating operational steps for sorting data in a structure, in accordance with an embodiment of the present invention.

Reference is now made to FIG. 2. FIG. 2 is flowchart 200 depicting operational steps of sort program 122 for sorting data in a structure, in accordance with an embodiment of the present invention.

In an embodiment, sort program 122 may allow a full debug experience of an application within a cloud environment, by providing minimal disruption to the application users.

In step 210 sort program 122 identifies the structure to be sorted. The structure to be sorted is similar to structure 126. Sort program 122 identifies a structure containing array with original set of data to sort. This structure may be known as the SDS bucket. Sort program 122 also identifies a second structure containing an empty key+payload array. Alternatively, sort program 122 creates a second structure containing an empty key+payload array. The key+payload array contains two elements. The 'key' aspect contains a small piece of the SDS bucket to be sorted. The partial key in the key+payload may contain up to 4 bytes. The 'payload' aspect contains the payload information to access a specific row in the SDS bucket corresponding to an entry.

In step 220 sort program 122 calculates a crossover point which prevents the performance of a radix sort form declining, by utilizing hybrid radix sort. The crossover point is based on a determination when to switch from the radix sort to the comparison sort. Stated differently, the crossover point is when to switch from a radix sort to a comparison sort. The crossover point occurs at log 2 (of the total number of records being sorted). This calculation is approximate due to the constraints in big O notation. The calculated crossover point may be determined as the radix sort, O(k*n), and the comparison sort, O(n log n), both approach each other. Thus, the determination of the crossover point may be mathematically determined through the equation: k*n=(n log n) which yields, k=log n. Therefore based on the aforementioned equation, an idealized initial cross over point between a radix sort and a comparison sort may be expressed as log 2 (number of tuples to sort). The calculated crossover point is used as the initial time in the countdown timer (as used in decision 240).

In step 230, sort program 122, performs a radix sort. Initially in step 230, sort program 122 populates the key+payload array, based on the original identified data set. A radix sort generates a sorted order by bucketizing pieces of the radix key. A radix sort bucketizes the first character, so that all values beginning with same letter fall into the same bucket. For example, all values beginning with the letter 'a' fall into the 'a' bucket. Similarly, all values beginning with the letter 'b' fall into the 'b' bucket, etc. Therefore, each individual buckets 'a'-'z' then become a sub problem to solve as the values within each bucket are not necessarily in order. Each bucket is referred to as a sub problem of the radix sort. The radix sort algorithm repeats for each sequential byte for each individual bucket. This process often creates buckets within buckets.

Prior to the first iteration of step 230, sort program 122 transforms data from the SDS bucket (the original data set) into a radix key in small pieces and sorted in the key+payload array. The payload contains information to access the row in the SDS bucket corresponding to an entry key in the key+payload array. The partial key in the key+payload array may contain up to four bytes. If there is less than 4 bytes in a column, the partial key, will contain 1, 2, or 3 bytes. If there are more than 4 bytes in a column, the partial key will contain the first 4 bytes, or the subsequent bytes up to four, etc. Once the key+payload array is populated, the radix sort is performed.

Duplicate resolutions occur when tuples containing the same radix key are spawned into a separate sub problems. For each sub problem, the next radix key is fetched and the resolution repeats itself, until the search finishes. Stated differently, during the first iteration of the radix sort (of step 230) the rightmost byte of the SDS bucket is placed into the 'key' structure while the 'payload' structure preserves the original order of the keys as the keys are placed into the structure. This provides a one-to-one correspondence between the buckets and the values that can be represented by the rightmost byte. The radix sort then sorts, the key array into a numerical and/or alphabetical order while maintaining the 'payload' rows correlating to the SDS bucket. The radix sort will group the keys based on similar bytes.

During an iteration of the radix sort, entries in the key+payload array are rearranged into a sorted order based on the radix key. Duplicate resolutions may be formed when tuples containing duplicate radix keys are spawned into a separate sub-problem.

In decision 240, sort program 122 determines if the countdown timer equals zero. The countdown timer is based on the calculating the cross-over point per step 220. Each time a radix sort iteration is preformed, the count town timer is reduced by 1, until the countdown timer is at zero. The countdown timer is incremented each time step 230 occurs. The starting value of the countdown timer, as determined in step 220 is based on log 2(number of tuples in the sub problem).

If in decision 240, the countdown timer is not equal to zero, then in step 245, the countdown timer is reduced by one, and the radix sort is repeated (step 230) for the next sequential radix key. Each additional iteration of a radix sort, sorts each grouping based on the next significant byte in the SDS bucket, and the countdown timer is reduced by one (see step 245). For example, each sub-problem of the previous iteration of the radix sort, the next radix key is fetched and the process repeats itself; whereby more sub problems may be generated. It is noted that, without the cutoff point (the countdown timer of step 240 not reaching zero), the geometric growth resulting from this process (due to the continual spawning of sub-problems and performing multiple passes on both arrays), may cause performance problems due to the overhead (memory and code path) of each spawned sub problem.

Each sub problem of the radix sort operates on the countdown timer's logic; therefore each round of radix sorting decreases the countdown timer by one, correlating to the number of bytes being radix sorted in each round. Therefore, when a sub problem hits a countdown timer of zero (as determined in step 240) the radix sort is concluded If in decision 240, the countdown timer is at zero, a comparison sort is performed then in step 250, sort program 122 directs the sorting to be completed by a comparison sort, thereby stopping the spawning process of the radix sort. The comparison sort will continue to sort the tuples in each sub problem approximately where the radix sort left off. Generally, a comparison sort, has the advantage of not spawning more sub problems, since it is capable of determining a final ordering. A comparison sort, compares two values and determines the proper order. The comparison sort will reach a specific ordering, as uses the original data in the SDS bucket as the sorting keys, as compared to the partial radix keys. Switching to a comparison sort prevents performance from declining by a repetitive radix sorts.

In an exemplary embodiment, the comparison sort may utilize bookkeeping information maintained throughout the duration of the radix sort. The bookkeeping information allows the comparison sort to begin at the point that is partway through the sorting key. For instance, if the radix sort is sorting multiple columns in a table and was in the middle of sorting the second key column, then the bookkeeping information allows the comparison sort to start from the second column and does not need to consider the first column.

Reference is now made to FIGS. 3A, 3B, 3C, 3D and 3E. FIGS. 3A-3E illustrate an exemplary implementation of sorting an array, via sort program 122, in accordance with an embodiment of the present invention. FIGS. 3A-E illustrate an embodiment of the present invention for sorting data in a database over a period of time.

Figure 3A:
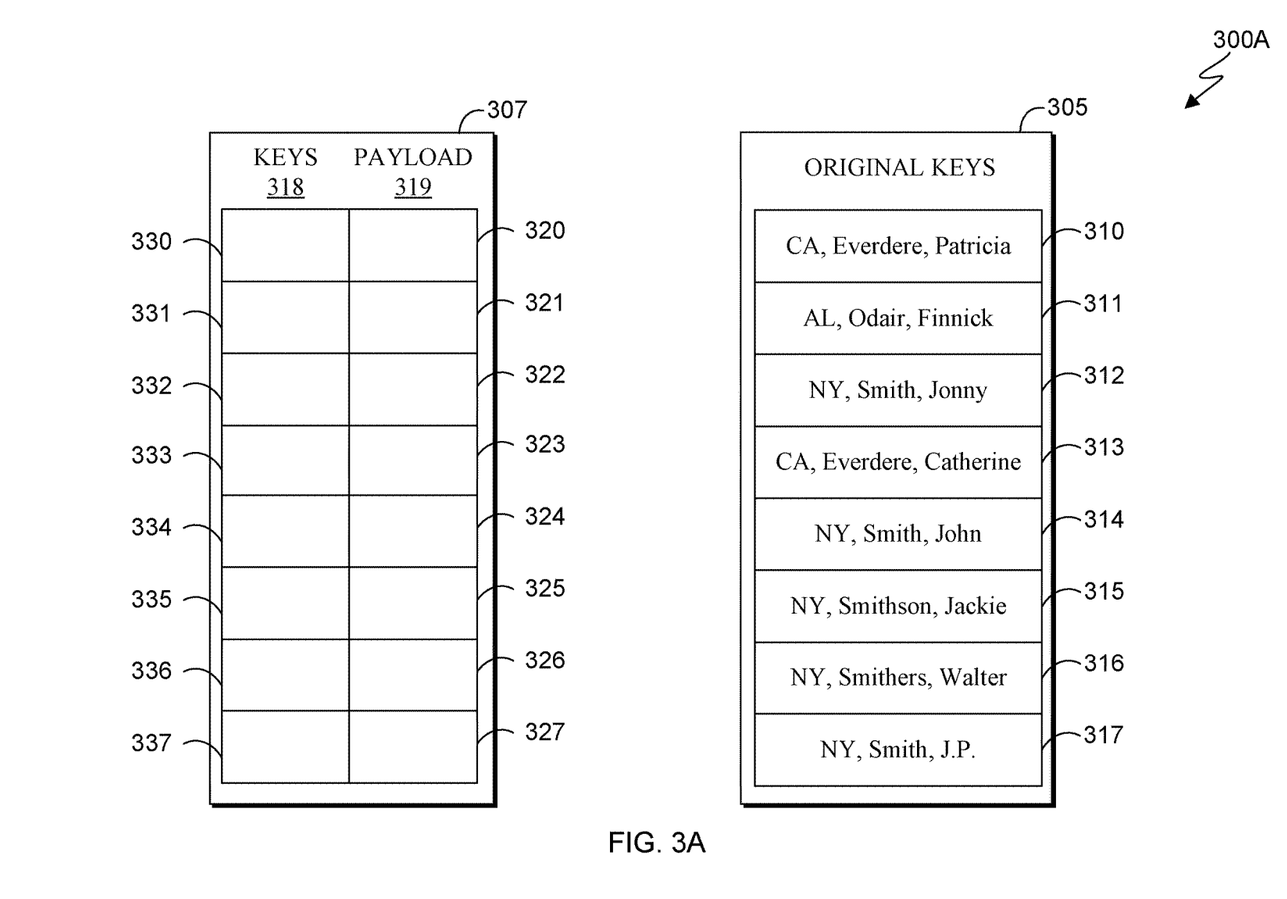
FIGS. 3A-3E illustrate an exemplary implementation of sorting an array, in accordance with an embodiment of the present invention.

FIG. 3A illustrates environment 300A at time at T=0. Environment 300A depicts original keys 305 containing a set of data to be sorted and keys+payload array 307. It is noted that at time T=0 keys, keys+payload array 307 is empty. Environment 300A represents step 210, as sort program 122 identifies both arrays.

Original keys 305, is an array containing an original set of data to be sorted. Original keys 305 contains 8 tuples, where row 310 is tuple zero, row 311 is tuple one, row 312 is tuple two, through tuple seven at row 317. Original keys 305 is an array of rows comprising a State and a full name (i.e., State, Last Name, First Name). For example, row 310 depicts CA, Everdere, Patricia, where CA is the State, 'Everdere' is an individual's last name 'Patricia' is the individual's first name. Original keys 305 is designated as SDS Bucket 0. It is appreciated that a data array similar to this, which is heavily skewed, may require a radix sort to spend a significant time sorting similar radix keys thereby causing the sort to not reach a final sorted order (i.e., the entire last name and then the first name) in a reasonable period of time. For instance original keys 305 depicts a plurality of names beginning with the letters "SMITH" (i.e., 312, 314, 315, 316, and 317). It is appreciated by those skilled in the art that original keys 305, is limited for exemplary purposes only, whereas in a large database, for example, a larger selection of data may be required to be sorted additionally multiple columns may be involved as a sort criteria, significantly enlarging the sorting key.

Keys+payload array 307 depicts a two columns, where one column (i.e., Key 318) is projected to contain individual byte of original keys 305 to be individually sorted and a second column, payload 319, relating the byte, from key 318 column, to its location on original keys 305.

Payload 319 represents a plurality of buckets (i.e., buckets 320, 321, 322, 323, 324, 325, 326 and 327, respectively) where each bucket may contain a location based tuple pair, corresponding to original keys 305. Payload 319 allows the sort program 122 to locate each original keys 305 to acquire the next partial byte, as well as, provide access the print to a console the sorted order. Key 318 represents a plurality of buckets (i.e., buckets 330, 331, 332, 333, 334, 335, 336 and 337) where each bucket may contain a byte to be sorted. Each byte in key 318 relates to the tuple pair in payload 319 in the same row. For example, data contained in the same row of keys+payload array 307 are linked, for instance, a byte contained in cell 332, is related to tuple pair in cell 322, which in return relates to a specific data cell of original keys 305.

Calculating the crossover point is determined to be after approximately three bytes of data have been radix sorted. Three bytes is determined by utilizing the equation log(base 2) of the total number of tuples being sorted, which yields log 2(8)=3, as there are 8 tuples depicted in original keys 305. Stated differently the number of bytes to be sorted is equal to the log (base 2) of the number of records being sorted. Once that is reached, sort program 122 switches from a radix sort to a comparison sort. In the depicted example, the countdown timer is set to three.

Figure 3B:
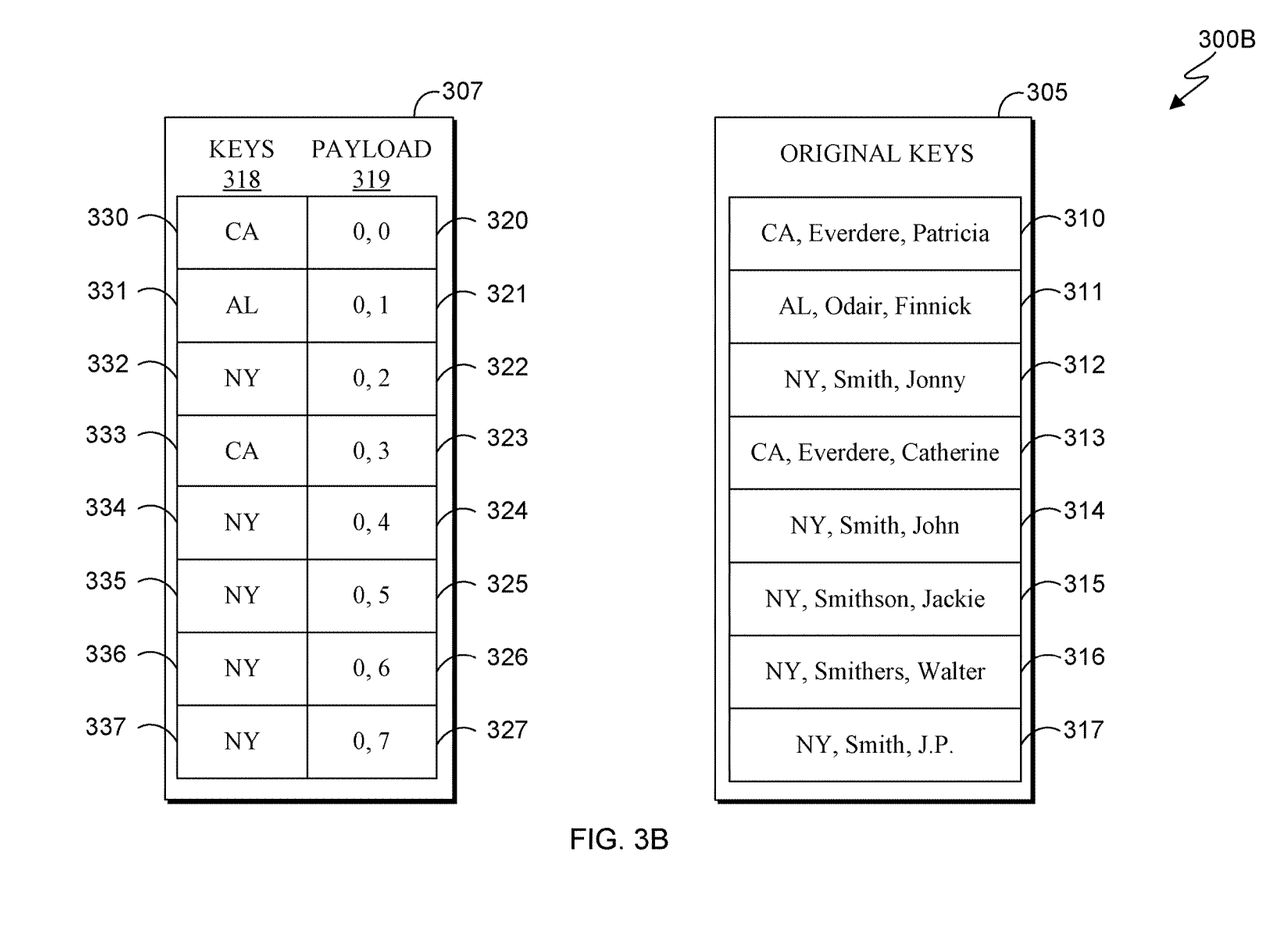

FIG. 3B illustrates environment 300B at time at T=1. Specifically, environment 300B illustrates original keys 305 containing data to be sorted, and keys+payload array 307 now loaded with the required information prior to performing the first iteration of a radix sort (recall that the first radix sort iteration is to sort the States).

In the example, the radix sort commences with the State; therefore, in the depicted environment 300B payload 319 contains two bytes separated by a comma, whereas keys 318 contains the associated State. The partial keys contained in keys 318 is limited to 4 bytes. Since a State abbreviation is only two bytes, sort program 122 only loads does not load bytes from separate key columns to take up all 4 bytes, rather the partial key is only two bytes in this instance. Regarding payload 319, the first byte designates the SDS bucket from which the data originates, while the second byte designates the tuple that is being sorted in the keys column of keys+payload array 307. Keys 318 in the depicted environment 300B, contains the State, a variable length, corresponding to the respective designation in payload 319. For example, bucket 322, depicts, "0, 2" corresponding to bucket 312 ('0' refers to original keys 305 (SDS bucket 0), and '2' refers to the tuple number two, where in this case corresponds to that of bucket of 312, (within original keys 305)).

Figure 3C:
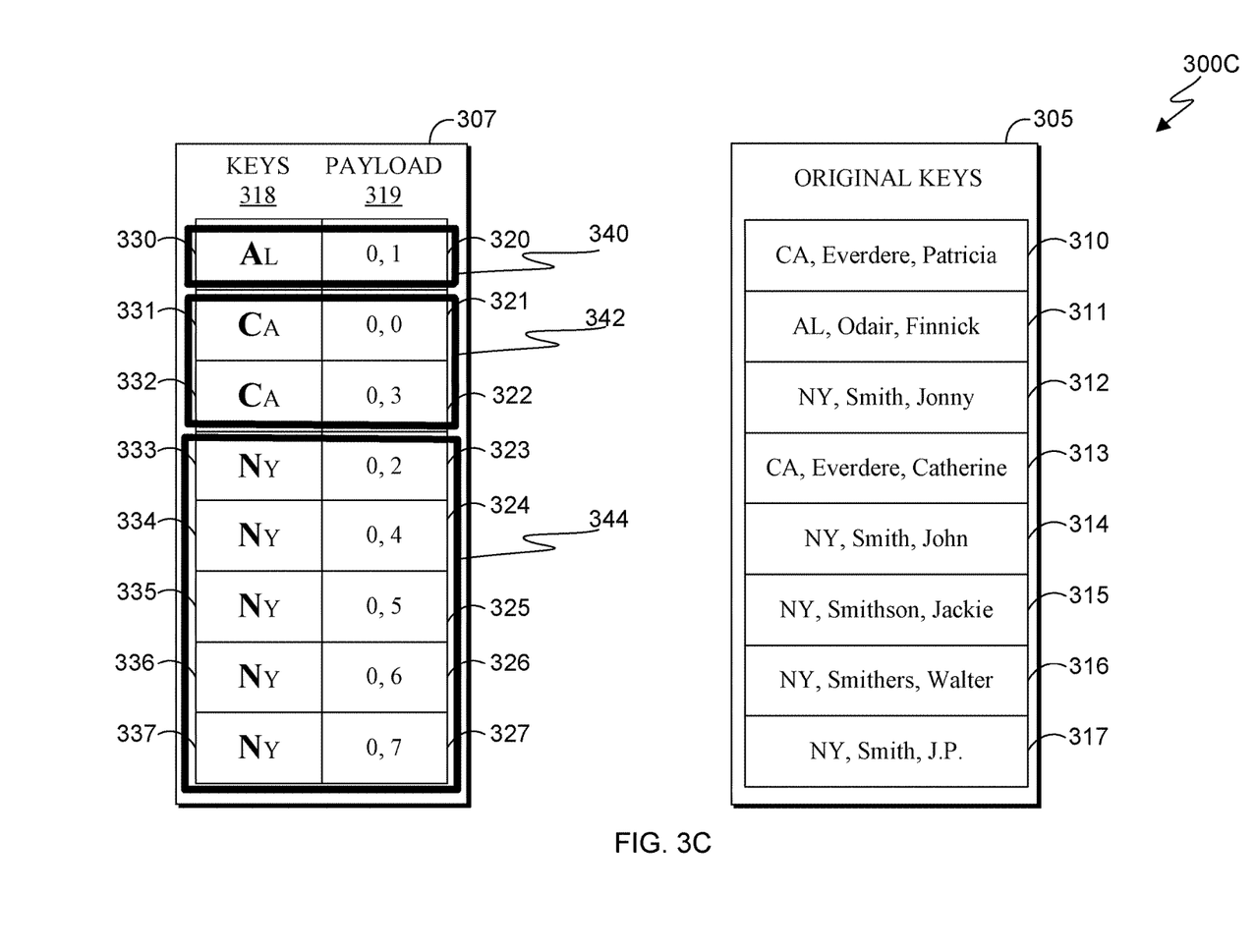

FIG. 3C illustrates environment 300C at time at T=2. Environment 300C depicts keys+payload array 307 after one iteration of a radix sort. The first radix sort organizes the data into three separate groupings (i.e., group 340, group 342 and group 344). These groupings may be known as sup problems. Group one 340 contains only an individual key, 330, that of AL. Group two 342 contain two entries, CA, located in buckets 331 and 332, respectively. Group three 344 contains 5 entries, NY, located in buckets 333, 334, 335, 336 and 337, respectively. It is noted that the radix sort at time T=2, sorts the first byte of keys 318. For example, of group one 340, the radix sort sorted based on the letter 'A'. Similarly, in group two 342, the radix sort, sorted based on the letter 'C'. Additionally, in group three 346, the radix sort, sorted based on the letter 'N'. For each successive radix sort, each sub problems is individually sorted. Group one 340 has only one entry, therefore this sub problem is completed, and considered sorted. Group two 342 and group three 344 both require additional sorting as the groupings have 2 and 5 tuples, respectively. Therefore, additional sorting is required to determine the proper order. Specifically, group two 342 and group three 344 will next be radix sorted based on their second byte.

Entries within group two, 342 and group three, 344, are independent from one another. Therefore, entries in each respective group, are grouped in an approximate order and therefore cannot be moved into another group. Through additional sorting iterations, each respective groups may be further subdivide by additional sub problems, but entries previously sorted cannot be moved into another group. Since the sorting is based on State then by last name, a row with a CA state cannot mix with a row with a NY state, regardless of an entries last name.

Figure 3D:
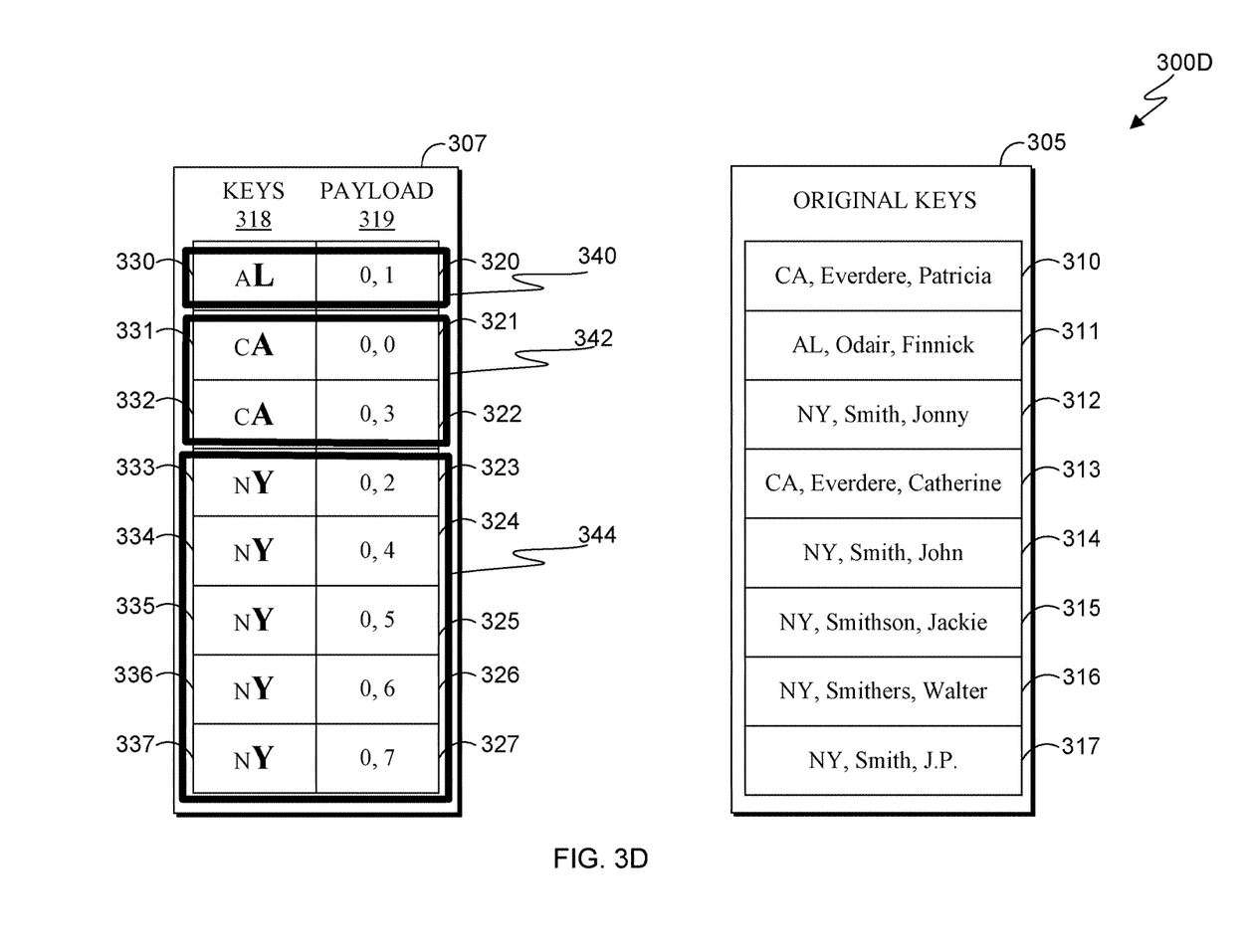

It is noted that after the first radix sort iteration, the countdown timer is reduced by one. Based on the earlier determination, two more radix sorts may be implemented, prior to sort program 122 switching to a comparison sort. acclimated FIG. 3D illustrates environment 300D at time at T=3. Environment 300D depicts keys+payload array 307 after two iteration of a radix sort. As depicted in keys 318 the radix sort took the next partial key, specifically the next byte of the State. It is noted that the radix sort at time T=2, sorts the second byte of keys 318, therefore, the second letter of each state is enlarged to draw attention that that is the letter being sorted per the second radix sort iteration. For example, of group one 340, the radix sort sorted based on the letter 'L'. Similarly, in group two 342, the radix sort, sorted based on the letter 'A'. Additionally, in group three 346, the radix sort, sorted based on the letter 'Y'. Group two, 342, and group three 344, are both individually radix sorted however since both individual groupings have identical keys, no observable sorting occurs. Therefore, group two 342 and group three 344 require additional sorting iterations as the groupings have 2 and 5 tuples, respectively.

It is noted that after the second radix sort iteration, the countdown timer is reduced again by one. Based on the earlier determination, one more radix sort may be implemented, prior to sort program 122 switching to a comparison sort.

Figure 3E:
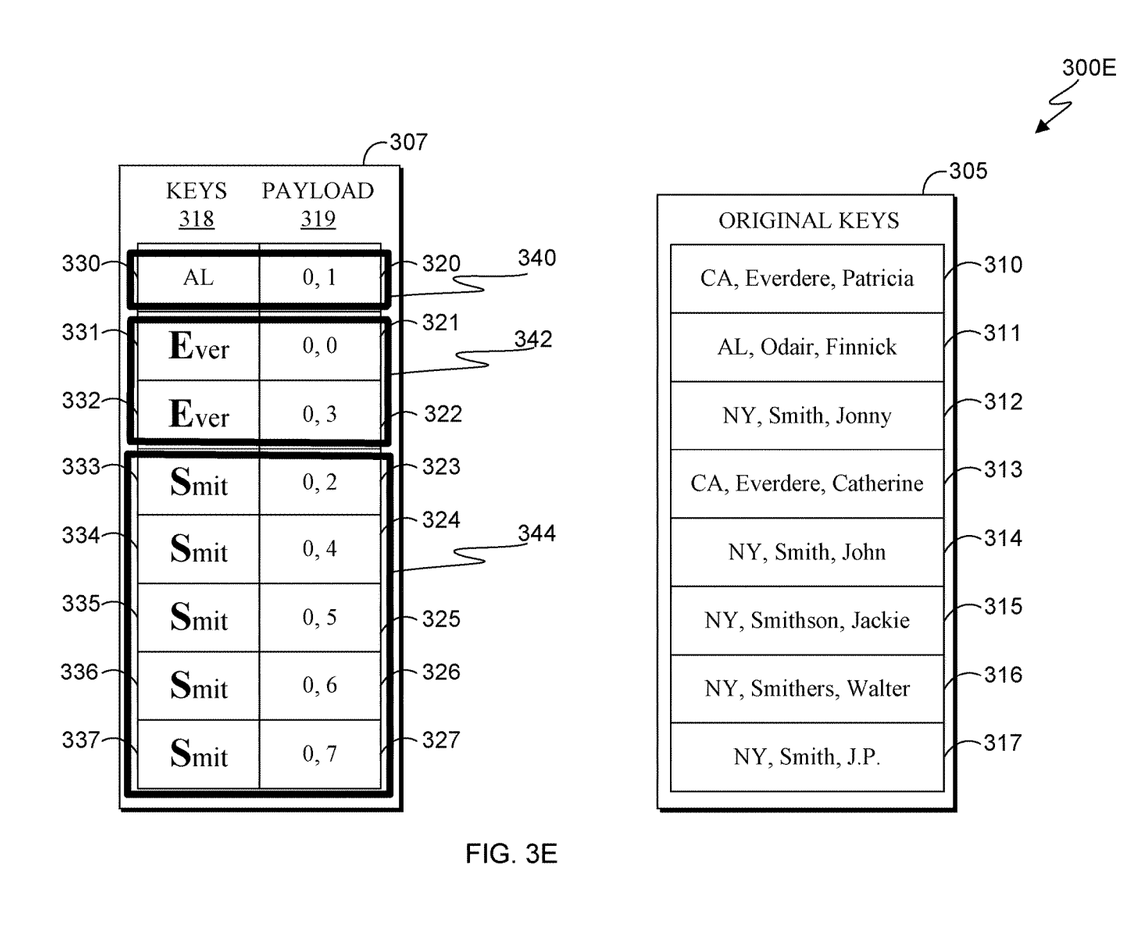

FIG. 3E illustrates environment 300E at time at T=4. Environment 300E depicts keys+payload array 307 sorted after three iteration of a radix sort. As depicted the next partial key, is selected. As depicted in keys 318 the next radix sort is based on the last name. The prior radix sort iterations was on the State column, at time T=4 the radix sort moves to the next column, specifically last name. The partial key in key+payload array 307 is 4 limited to a maximum of four bytes. Therefore, the partial keys used in key 318 column are the first four bytes of a person's last name. If the last name column does not have at least four bytes, sort program 122 does not load bytes from a separate key column to take up all four bytes of the partial key. The radix sort at time T=4, sorts the first byte of keys 318, therefore, the first letter of each last name is enlarged to draw attention that that is the letter being sorted per the third radix sort iteration. Group one 340 is not included in the sorting as it is already in the proper location. Group two 342, and group three 344, are both individually radix sorted however since both individual groupings have the identical key, 'E' and 'V', respectively, no observable sorting occurs. Therefore, group two 342 and group three 344 require additional sorting as the groupings have 2 and 5 tuples, respectively.

It is noted that after the third radix sort iteration, the countdown timer is reduced again by one. Based on the earlier determination, no more radix sorts are completed, as the countdown timer has reached zero, therefore sort program 122 switches to a comparison based sort. The comparison sort sorts the two sub-problems, group two 342 and group three 344. For example, a comparison sort will continue sorting group two 342 starting on the second key of last name. Similarly, a comparison sort will continue sorting group three 344 starting on the second key of last name. The comparison sort will look at the reminder of the keys, starting with the last name (skipping the State column) and preforms the sort based on the original key values.

In order for sort program 122 to activate a comparison sort at the approximate location the radix sort concludes, sort program 122 stores data, known as bookkeeping. By utilizing a bookkeeping method, sort program 122 identifies the approximate location the radix sort concluded, thereby providing the comparison sort an approximate location to commence sorting, reducing the necessity to re-sort previously sorted data.

Bookkeeping is established prior to the initial radix sort iteration. An exemplary sample of bookkeeping may be expressed as 'TupleStart, TupleEnd, BytesSorted, KeyIndex'. In the ongoing example, TupleStart and TupleEnd refer to the ranges in keys+payload array 307 that are sorted. Prior to the first iteration of the radix sort, at Time T=1, TupleStart is zero while TupleEnd is eight. BytesSorted is zero since no radix sort has been performed. Similarly, KeyIndex is zero as sorting will start on the first key, the State. At Time T=2, one byte of the State has been sorted, so KeyIndex remains at 0 and BytesSorted is increased by 1. At Time T=2, three groups are formed—group one, 340, group two 342, and group three 344). The bookeeping information for group two 342 may be expressed as: TupleStart is one, TupleEnd is three, BytesSorted is zero, and KeyIndex is one. The bookkeeping information for group three 344 may be expressed as TupleStart is three, TupleEnd is eight, BytesSorted is zero, and KeyIndex is one. Those skilled in the art may appreciate that there is no bookkeeping information needed for group one 340 as the sorting is complete. As the sort progresses (Time T=3 and T=4) and the radix sort continues fetching more partial keys, 'BytesSorted' is updated to allow the code to resume fetching partial keys from the correct offset within last name, first name. Sort program 122 utilizes bookkeeping data, to derive where in the key to currently sort as well as which rows to move in the keys+payload array 307. In an embodiment the countdown timer may be included with the bookkeeping data.

When the countdown timer reaches zero, regardless of the number of sub problems the radix sort generated, a comparison sort is initiated. It is noted that even if each round of radix sorting does not cut down the number of tuples in a given sub problem, the countdown timer will eventually reach zero (in this example after 3 iterations). When the countdown timer reaches zero, sort program 122 initiates a comparison sort on each of the sub problems, where the radix sort left off, based on the bookkeeping data.

In an embodiment, the comparison sort is on the original data, and not on the transformed radix sort version. The comparison sort uses the original data, contained in original keys 305 in the SDS bucket as the sorting keys (instead of the partial radix key). Therefore the comparison sort will reach a definitive ordering and eliminates spawning off. Thus, the comparison sort sorts each grouping individually. For example, group two, 342, and group three 344, are both individually sorted via a comparison sort.

After all the groups are sorted, sort program may scan the payload 319 array (which is in the new sorted order) and print out the original key, based on the sorted order.

Figure 4:
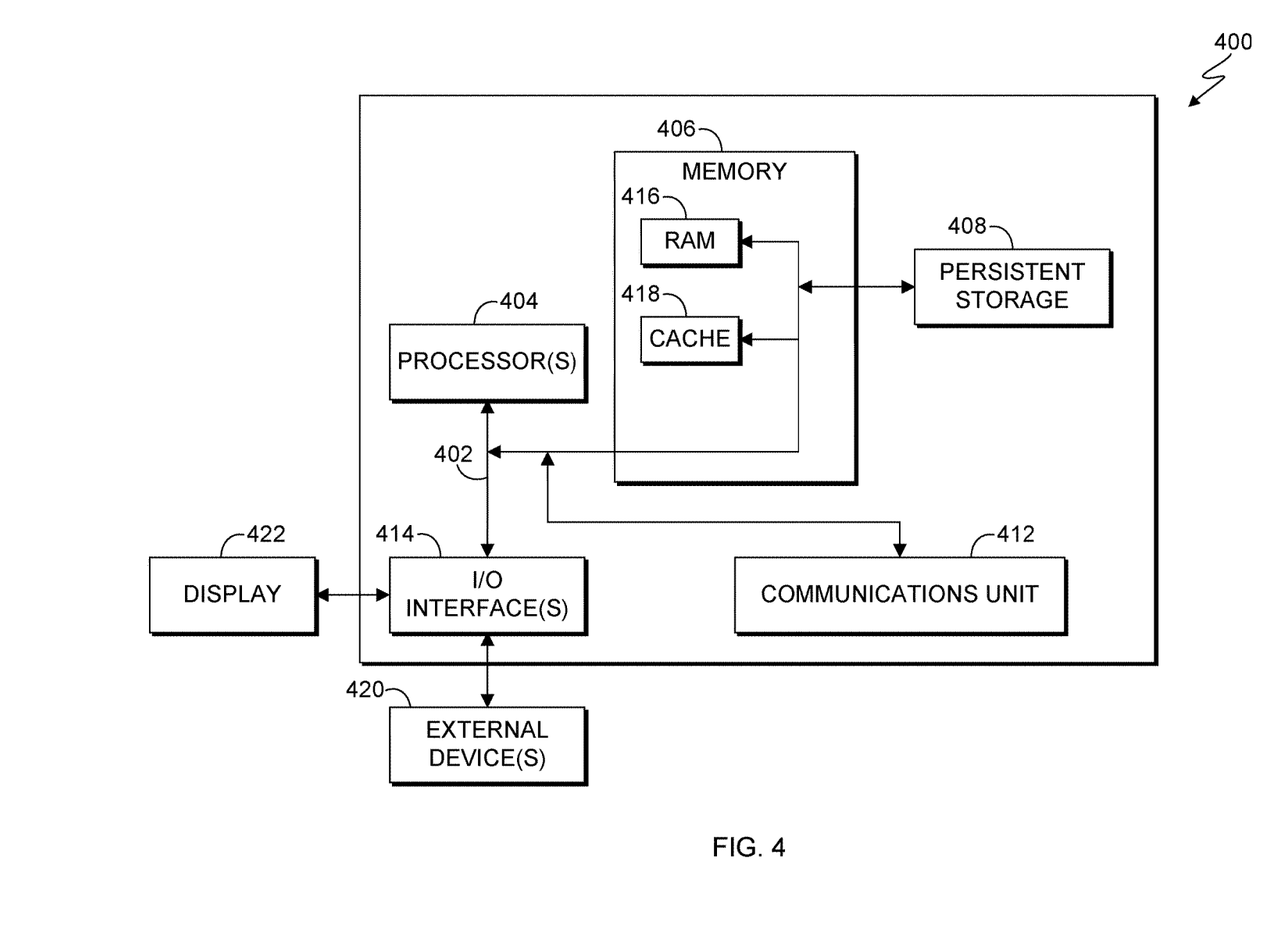
FIG. 4 depicts a block diagram of internal and external components of an electronic device, in accordance with an embodiment of the present invention.

FIG. 4 depicts a block diagram of internal and external components of a device 400, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software (e.g., sort program 122) is stored in persistent storage 408 for execution and/or access by one or more of the respective processors 404 via one or more memories of memory 406.

Persistent storage 408 may include, for example, a plurality of magnetic hard disk drives. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412 provides for communications with other computer systems or devices via a network. In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 412 (e.g., via the Internet, a local area network or other wide area network). From communications unit 412, the software and data can be loaded onto persistent storage 408.

I/O interface(s) 414 allows for input and output of data with other devices that may be connected to device 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving sorting performance of a computing device, the method comprising:

accessing, by one or more processors of the computing device, a set of data to be sorted, wherein the set of data exists in a first order, and includes a plurality of tuples, wherein each tuple is comprised of one or more values;

determining, by one or more processors, a quantity of iterations of radix sorting to perform on the set of data based, in part, on a quantity of tuples comprising the set of data to be sorted, wherein a completion of the quantity of iterations of radix sorting establishes a crossover point;

recursively performing, by one or more processors of the computing device, one or more iterations of radix sorting according to the determined quantity of iterations, wherein each iteration of radix sorting is based on a key corresponding to a value at a particular position within each tuple of the plurality of tuples of the set of data, and wherein each radix sorting generates one or more buckets of grouped data of the set of data;

recording, by one or more processors of the computing device, a set of bookkeeping information associated with the radix sorting performed according to the determined quantity of iterations, wherein the set of bookkeeping information includes a respective position of the value within each tuple of the plurality of tuples of the set of data on which the particular iteration of radix sorting is performed;

subsequent to recursively performing the determined quantity of iterations of radix sorting, performing at the crossover point, by one or more processors of the computing device, one or more comparison sorts on a portion of each tuple of the plurality of tuples of the set of data subsequent to keys of each tuple sorted by the radix sorting, based on the set of bookkeeping information associated with the determined quantity of iterations of radix sorting performed; and generating, by one or more processors of the computing device, a result of the set of data sorted in a second order, wherein the result in the second order is generated by a combination of radix sorting and comparison sorting.

2. The method of claim 1, wherein determining the number of iterations of radix sorting to perform on keys corresponding to a value at a particular position within each tuple of the plurality of tuples of the set of data of the set of data is based on a base-two logarithmic value of the quantity of tuples of the plurality of tuples of the set of data.

3. The method of claim 1, wherein:

recursively performing radix sorting according to the determined quantity of iterations includes program instructions to generate a plurality of buckets of grouped data of the set of data; and wherein:

performing the one or more comparison sorts on portion of the set of data subsequent to the keys of the set of data sorted by the radix sorting comprises performing, by one or more processors, one comparison sort on the grouped data of the set of data within each bucket of the plurality of buckets.

4. The method of claim 1, further wherein:

the set of bookkeeping information associated with the radix sorting performed according to the determined quantity of iterations includes recording a key of a particular position of the one or more values within the plurality of tuples after each of the determined quantity of iterations of radix sorting.

5. The method of claim 1, wherein each key is less than or equal to four bytes of data within a tuple of the plurality of tuples of the set of data.

6. The method of claim 1, further comprising:
setting, by one or more processors, a countdown timer to the determined quantity of iterations of radix sorting to perform; and
decreasing, by one or more processors, the countdown timer subsequent to each iteration of radix sorting.

7. The method of claim 1, wherein determining, by one or more processors of the computing device, a crossover point which occurs subsequent to the quantity of iterations of radix sorting, and at which sorting switches from a radix sort to a comparison sort, wherein the crossover point occurs under conditions in which the growth rate of the radix sort equals the growth rate of the comparison sort, and wherein the growth rate is based on a quantity of tuples to be sorted, and a quantity of bytes used as a key for the radix sort.

8. A computer program product for improving sorting performance of a computing device, the computer program product comprising:
a computer readable storage medium and program instructions stored on the computer readable storage medium, the program instructions comprising:
program instructions to access a set of data to be sorted, wherein the set of data exists in a first order, and includes a plurality of tuples, wherein each tuple is comprised of one or more values;
program instructions to determine a quantity of iterations of radix sorting to perform on the set of data based, in part, on a quantity of tuples comprising the set of data to be sorted, wherein a completion of the quantity of iterations of radix sorting establishes a crossover point;
program instructions to recursively perform one or more iterations of radix sorting according to the determined quantity of iterations, wherein each iteration of radix sorting is based on a key corresponding to a value at a particular position within each tuple of the plurality of tuples of the set of data, and wherein each radix sorting generates one or more buckets of grouped data of the set of data;
recording, by one or more processors of the computing device, a set of bookkeeping information associated with the radix sorting performed according to the determined quantity of iterations, wherein the set of bookkeeping information includes a respective position of the value within each tuple of the plurality of tuples of the set of data on which the particular iteration of radix sorting is performed;
subsequent to recursively performing the determined quantity of iterations of radix sorting, program instructions to perform at the crossover point one or more comparison sorts on a portion of each tuple of the plurality of tuples of the set of data subsequent to keys of each tuple sorted by the radix sorting, based on the set of bookkeeping information associated with the determined quantity of iterations of radix sorting performed; and
generating, by one or more processors of the computing device, a result of the set of data sorted in a second order, wherein the result in the second order is generated by a combination of radix sorting and comparison sorting.

9. The computer program product of claim 8, wherein determining the number of iterations of radix sorting to perform on keys corresponding to a value at a particular position within each tuple of the plurality of tuples of the set of data of the set of data is based on a base-two logarithmic value of the quantity of tuples of the plurality of tuples of the set of data.

10. The computer program product of claim 8, wherein:
program instructions to recursively perform radix sorting according to the determined quantity of iterations includes program instructions to generate a plurality of buckets of grouped data of the set of data; and wherein:
program instructions to perform the one or more comparison sorts on portion of the set of data subsequent to the keys of the set of data sorted by the radix sorting comprises performing, by one or more processors, one comparison sort on the grouped data of the set of data within each bucket of the plurality of buckets.

11. The computer program product of claim 8, wherein program instructions to store the set of bookkeeping information associated with the radix sorting performed according to the determined quantity of iterations includes program instructions to record a key of a particular position of the one or more values within the plurality of tuples after each of the determined quantity of iterations of radix sorting.

12. The computer program product of claim 8, wherein each key is less than or equal to four bytes of data within a tuple of the plurality of tuples of the set of data.

13. The computer program product of claim 8, further comprising:
program instructions to set a countdown timer to the determined quantity of iterations of radix sorting to perform; and
program instructions to decrease the countdown timer subsequent to each iteration of radix sorting.

14. A computer system for improving sorting performance of a computing device, the computer system comprising:
one or more computer processors;
one or more computer readable storage media;
program instructions stored on the one or more computer readable storage media for execution by at least one of the one or more processors, the program instructions comprising:
program instructions to access a set of data to be sorted, wherein the set of data exists in a first order, and includes a plurality of tuples, wherein each tuple is comprised of one or more values;
program instructions to determine a quantity of iterations of radix sorting to perform on the set of data based, in part, on a quantity of tuples comprising the set of data to be sorted, wherein a completion of the quantity of iterations of radix sorting establishes a crossover point;
program instructions to recursively perform one or more iterations of radix sorting according to the determined quantity of iterations, wherein each iteration of radix sorting is based on a key corresponding to a value at a particular position within each tuple of the plurality of tuples of the set of data, and wherein each radix sorting generates one or more buckets of grouped data of the set of data;
recording, by one or more processors of the computing device, a set of bookkeeping information associated with the radix sorting performed according to the determined quantity of iterations, wherein the set of bookkeeping information includes a respective position of the value within each tuple of the plurality of tuples of the set of data on which the particular iteration of radix sorting is performed;

subsequent to recursively performing the determined quantity of iterations of radix sorting, program instructions to perform at the crossover point one or more comparison sorts on a portion of each tuple of the plurality of tuples of the set of data subsequent to keys of each tuple sorted by the radix sorting, based on the set of bookkeeping information associated with the determined quantity of iterations of radix sorting performed; and generating, by one or more processors of the computing device, a result of the set of data sorted in a second order, wherein the result in the second order is generated by a combination of radix sorting and comparison sorting.

15. The computer system of claim 14, wherein determining the number of iterations of radix sorting to perform on keys corresponding to a value at a particular position within each tuple of the plurality of tuples of the set of data of the set of data is based on a base-two logarithmic value of the quantity of tuples of the plurality of tuples of the set of data.

16. The computer system of claim 14, wherein:
program instructions to recursively perform radix sorting according to the determined quantity of iterations includes program instructions to generate a plurality of buckets of grouped data of the set of data; and wherein:
program instructions to perform the one or more comparison sorts on portion of the set of data subsequent to the keys of the set of data sorted by the radix sorting comprises performing, by one or more processors, one comparison sort on the grouped data of the set of data within each bucket of the plurality of buckets.

17. The computer system of claim 14, wherein
program instructions to store the set of bookkeeping information associated with the radix sorting performed according to the determined quantity of iterations includes program instructions to record a key of a particular position of the one or more values within the plurality of tuples after each of the determined quantity of iterations of radix sorting.

18. The computer system of claim 14, wherein each key is less than or equal to four bytes of data within a tuple of the plurality of tuples of the set of data.

19. The computer system of claim 14, further comprising:
program instructions to set a countdown timer to the determined quantity of iterations of radix sorting to perform; and
program instructions to decrease the countdown timer subsequent to each iteration of radix sorting.

20. The computer system of claim 14, wherein program instructions to determine a crossover point which occurs subsequent to the quantity of iterations of radix sorting, and at which sorting switches from a radix sort to a comparison sort, wherein the crossover point occurs under conditions in which the growth rate of the radix sort equals the growth rate of the comparison sort, and wherein the growth rate is based on a quantity of tuples to be sorted, and a quantity of bytes used as a key for the radix sort.

* * * * *